United States Patent
Raj et al.

(10) Patent No.: US 12,141,560 B2
(45) Date of Patent: Nov. 12, 2024

(54) HYBRID-FEEDBACK DRIVEN TRANSPILER SYSTEM

(71) Applicant: Bank of America Corporation, Charlotte, NC (US)

(72) Inventors: Utkarsh Raj, Charlotte, NC (US); Paul Jacob Abernathy, Charlotte, NC (US); Vijaya Rudraraju, Charlotte, NC (US); William Cruise, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 130 days.

(21) Appl. No.: 18/055,558

(22) Filed: Nov. 15, 2022

(65) Prior Publication Data

US 2024/0160422 A1    May 16, 2024

(51) Int. Cl.
G06F 8/51    (2018.01)

(52) U.S. Cl.
CPC ...................... *G06F 8/51* (2013.01)

(58) Field of Classification Search
CPC .......................................... G06F 8/51
USPC .................................. 717/136–146
See application file for complete search history.

(56) References Cited

U.S. PATENT DOCUMENTS

| | | | |
|---|---|---|---|
| 7,284,241 B2 * | 10/2007 | Heishi | G06F 8/4441 717/146 |
| 9,111,071 B2 | 8/2015 | Kerschbaum | |
| 9,430,200 B1 | 8/2016 | Trofin et al. | |
| 9,710,243 B2 | 7/2017 | O'Hara et al. | |
| 9,740,463 B2 | 8/2017 | Grimmer et al. | |
| 10,713,039 B2 * | 7/2020 | Gupta | G06F 8/76 |
| 10,855,696 B2 | 12/2020 | Overson et al. | |
| 11,068,244 B2 | 7/2021 | Rich et al. | |
| 11,487,522 B1 * | 11/2022 | Singh | G06F 8/53 |
| 11,842,174 B2 * | 12/2023 | Ni | G06F 8/41 |
| 11,893,385 B2 * | 2/2024 | Balasubramanian | G06F 8/75 |
| 11,899,566 B1 * | 2/2024 | Singh | G06F 11/3684 |
| 2008/0221864 A1 * | 9/2008 | Blumenthal | G06F 40/40 704/4 |
| 2015/0128114 A1 | 5/2015 | O'Hara et al. | |
| 2015/0160934 A1 | 6/2015 | Beit-Aharon | |
| 2017/0046137 A1 | 2/2017 | Grimmer et al. | |
| 2018/0165077 A1 | 6/2018 | Beit-Aharon | |
| 2018/0165078 A1 | 6/2018 | Beit-Aharon | |

(Continued)

OTHER PUBLICATIONS

Kulkarni et al., "Transpiler and it's Advantages", 2015, International Journal of Computer Science and Information Technologies, pp. 1629-1631. (Year: 2015).*

(Continued)

Primary Examiner — Ted T. Vo
(74) Attorney, Agent, or Firm — Banner & Witcoff, Ltd.

(57) ABSTRACT

Various aspects of the disclosure relate to bi-directional hybrid-feedback driven self-healing and self-scaling language transpiler system may include bi-directional hopping to support multi language transpilation, automatic conversion of a mapping into a transformation specification, a hybrid feedback mechanism to update the transformation mappings, automatic scaling and/or creation of enterprise wide mapping and token (e.g., grammar) vocabulary, and/or a self-healing and/or corrective translation capability to perform automatic correction of any partial transpilations over time from a learned mapping.

20 Claims, 3 Drawing Sheets

(56) References Cited

U.S. PATENT DOCUMENTS

2018/0196651 A1      7/2018   Dettinger et al.

OTHER PUBLICATIONS

Roziere, "Unsupervised Translation of Programming Languages", 2020, Neural Information Processing Systems, 11 pages. (Year: 2020).*

Utkin et al., "Evaluating the Impact of Source Code Parsers on ML4SE Models", 2022, ACM, 12 pages. (Year: 2022).*

Marie-Anne Lachaux, Lowik Chanussot and Guillaume Lample, "Deep learning to translate between programming languages", https://ai.facebook.com/blog/deep-learning-to-translate-between-programming-languages/, pp. 10, Jul. 21, 2020.

* cited by examiner

HYBRID-FEEDBACK DRIVEN TRANSPILER SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, it may be difficult for such an organization, such as a financial institution, to efficiently, effectively, securely, and uniformly manage its computer systems, and particularly manage how internal computer systems exchange information with external computer systems in providing and/or supporting different products and services offered by the organization. Often, applications and/or data repositories are migrated to different platforms, due to many reasons including hardware obsolescence, software obsolescence, platform vendor migration, and the like.

Many data and platform migration projects may require and/or benefit from a "lift and shift" strategy where the platform and data components are migrated. In some cases, such as with data repository migration projects, historical information such as code and its residuals like time and business critical reports, may often be left within the original platform after migration to the new platform is completed. Often, these residuals may be translated over time and in many cases cause immense technical debt on users and teams that are migrated over to the new technology since the old code must be regenerated on the new platform and/or the older hardware must continue to operate in parallel with the new platform. This problem is not only re-occurring but includes huge hidden costs in terms of time, money, and computing power. Often costly vendor solutions may be explored, but these new vendor solution may be required to navigate and understand the complex existing technological ecosystem of the enterprise network and/or spend long time and effort in resolving the technical debt. Such efforts may be better applied to more productive activities.

Current language conversion technologies may use a "brute force" method where terms from a source language may be substituted with a defined term of the target language. Unfortunately, such systems fail to learn from errors and remain error prone. Other methods may use a general model that requires large amounts of data, which leaves the system open to biasing errors due to characteristics of particular datasets. Once these biasing errors are learned, they are difficult, if not impossible to unlearn thus causing the model to be unusable outside a certain learned environment.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

Aspects of the disclosure relate to computer hardware and software. In particular, one or more aspects of the disclosure generally relate to computer hardware and software for a bi-directional hybrid-feedback driven self-healing and self-scaling language transpiler.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes parsing and transforming code via a natural language processing system to generate code in another language.

In some cases, a bi-directional hybrid-feedback driven self-healing and self-scaling language transpiler system may establish and provide a robust framework facilitate transpilation capabilities that are self-correcting and self-scaling. Such functionality may improve operation of technical platform migrations by automatically translating an existing code base without user intervention. A natural language processor may include machine learning and/or artificial intelligence capabilities to facilitate learning from established and/or trained language vocabularies and/or language models. An automated mapping to a conversion service allows the natural language processing system to generate simple mappings that may be translated into configuration specifications, which may be pushed down to the mapping transformation components to update the transpiler.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

In some cases, the bi-directional hybrid-feedback driven self-healing and self-scaling language transpiler system may perform various methods to generate automatic scaling and/or self-correcting conversions of a given source language and/or related dialects into a given target language and/or target language dialects. In some cases, a method may include an initial configuration, initialization, and/or setup to start a transpilation process between any two or more given languages. The method may incorporate natural language processing and/or other feedback to perform one or more autocorrection functionalities to continue building upon an initialized token, model and/or transformer vocabularies. A mapping configuration for multiple vocabularies may be automatically generated from the specification and may be based on a two or multi-hop scheme that allows the transpilation capability to continuously scale, thus allowing for increased accuracy over time. The natural language processor and other generated feedback methods may be continuously combined to increase accuracy and optimization over time when building a knowledge base. The knowledge base may be converted into an enterprise mapping vocabulary.

Features of the bi-directional hybrid-feedback driven self-healing and self-scaling language transpiler system may include bi-directional hopping to support multi language transpilation, automatic conversion of a mapping into a transformation specification, a hybrid feedback mechanism to update the transformation mappings, automatic scaling and/or creation of enterprise wide mapping and token (e.g., grammar) vocabulary, and/or a self-healing and/or corrective translation capability to perform automatic correction of any partial transpilations over time from a learned mapping.

Figure 1A:
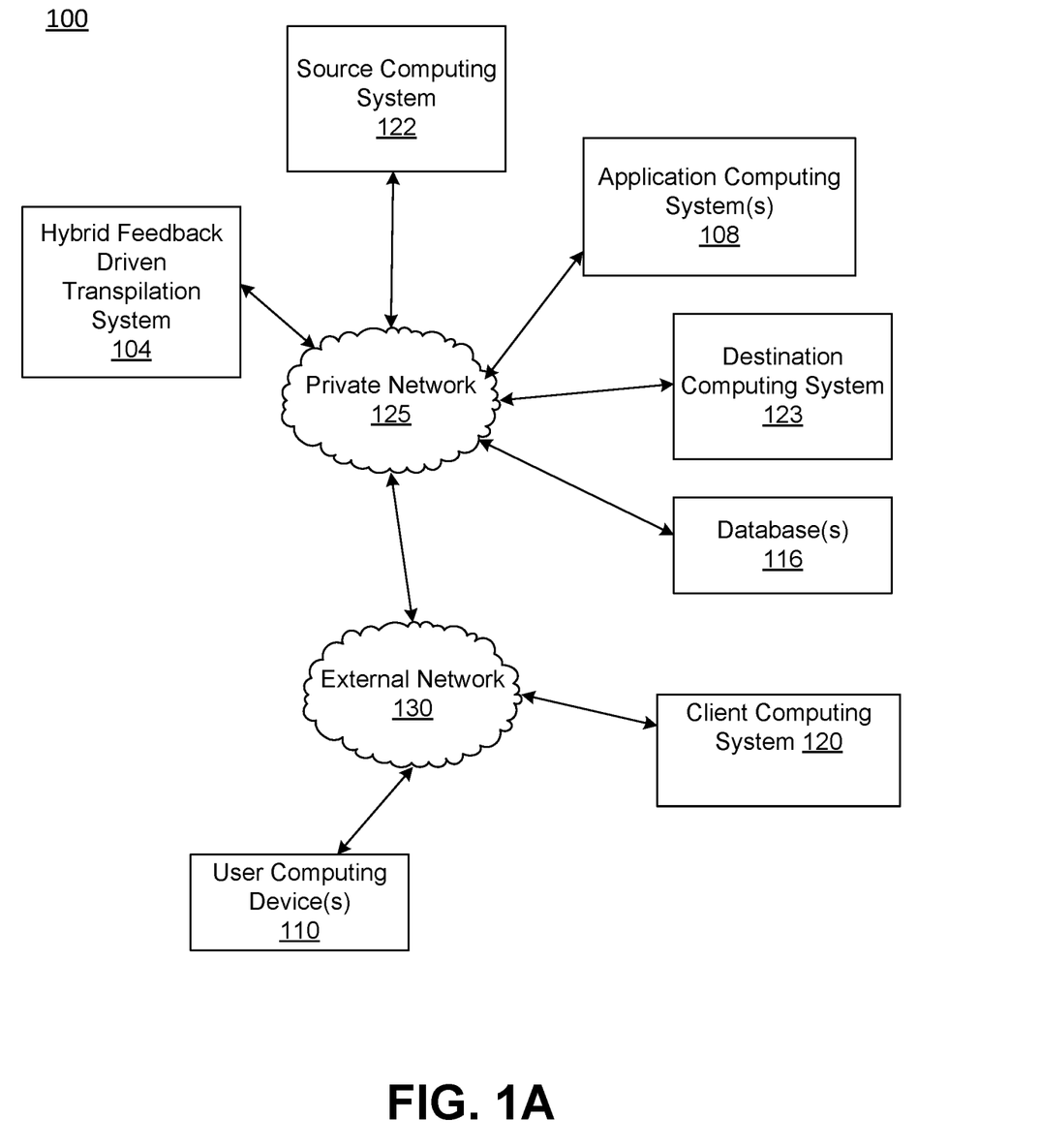
FIG. 1A shows an illustrative computing environment for feedback driven transpilation of code, in accordance with one or more aspects described herein.

FIG. 1A shows an illustrative computing environment 100 for feedback driven transpilation of code, in accordance with one or more arrangements. The computing environment 100 may comprise one or more devices (e.g., computer systems, communication devices, and the like). The computing environment 100 may comprise, for example, a hybrid feedback driven transpilation system 104, one or more application computing systems 108, a source computing system 122, a destination computing system 123, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a client computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the source computing system 122 and the destination computing system 123 as being separate computing systems, one or both of the source computing system 122 and the destination computing system 123 may be incorporated within the one or more of the application computing systems 108 and/or the databases 116.

The hybrid feedback driven transpilation system 104 may comprise one or more computing devices and/or other computer components (e.g., processors, memories, communication interfaces) configured to perform one or more functions as described herein. Further details associated with the architecture of the hybrid feedback driven transpilation system 104 are described with reference to FIG. 1B.

The application computing systems 108, the source computing system 122 and/or the destination computing system 123 may comprise one or more computing devices and/or other computer components (e.g., processors, memories, communication interfaces). In addition, the application computing systems 108, the source computing system 122 and/or the destination computing system 123 may be configured to host, execute, and/or otherwise provide one or more enterprise applications. In some cases, the application computing systems 108 may host one or more services configured facilitate operations requested through one or more API calls, such as data retrieval and/or initiating processing of specified functionality. In some cases, the source computing system 122 and/or the destination computing system 123 may be configured to communicate with one or more of the application computing systems 108 such as via direct communications and/or API function calls and the services. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, and/or other programs associated with the financial institution. The application computing systems 108, the source computing system 122 and/or the destination computing system 123 may comprise various servers and/or databases that store and/or otherwise maintain account information, such as financial account information including account balances, transaction history, account owner information, and/or other information. In addition, the client computing system 122 and/or the application systems 108 application computing systems 108, the source computing system 122 and/or the destination computing system 123 may process and/or otherwise execute transactions on specific accounts based on commands and/or other information received from other computer systems comprising the computing environment 100. In some cases, one or more of the application computing systems 108, the source computing system 122 and/or the destination computing system 123 may be configured, for example, to host, execute, and/or otherwise provide one or more transaction processing programs, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, an application computing systems 108 may be linked to and/or operated by a specific enterprise user (who may, for example, be an employee or other affiliate of the enterprise organization) who may have administrative privileges to perform various operations within the private network 125. In some cases, the application computing systems 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The source computing system 122, the destination computing system 123 and/or the client computing system 120 may comprise one or more computing devices and/or other computer components (e.g., processors, memories, communication interfaces). The source computing system 122, the destination computing system 123 and/or the client computing system 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where one or more of the source computing system 122, the destination computing system 123 and/or the client computing system 120 is for processing an electronic exchange of goods and/or services. The s source computing system 122, the destination computing system 123 and/or the client computing system 120 may be associated with a specific goods purchasing activity, such as purchasing a vehicle, transferring title of real estate may perform communicate with one or more other platforms within the system 100. In some cases, the source computing system 122, the destination computing system 123 and/or the client computing system 120 may integrate API calls to request data, initiate functionality, or otherwise communicate with the one or more application computing systems 108, such as via the services. For example, the services may be configured to facilitate data communications (e.g., data gathering functions, data writing functions, and the like) between the source computing system 122, the destination computing system 123 and/or the client computing system 120 and the one or more application computing systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the hybrid feedback driven transpilation system 104. For example, the database(s) 116 may store one or more source language libraries, one or more destination language libraries, a learned natural language processing (NLP) lexicon, and the like. In an arrangement, the database(s) 116 may be used for other purposes as described herein. In some cases, the hybrid feedback driven transpilation system 104, the application computing systems 108, the source computing system 122 and/or the destination computing system 123 may write data or read data to the database(s) 116 via the services.

In one or more arrangements, the hybrid feedback driven transpilation system 104, the application computing systems 108, the source computing system 122, the destination computing system 123, the client computing system 120, the user computing devices 110, and/or the other devices/systems in the computing environment 100 may be any type of computing device capable of receiving input via a user interface, and communicating the received input to one or more other computing devices in the computing environment 100. For example, the hybrid feedback driven transpilation system 104, the application computing systems 108, the source computing system 122, the destination computing system 123, the client computing system 120, the user computing devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the hybrid feedback driven transpilation system 104, the application computing systems 108, the source computing system 122, the destination computing system 123, the client computing system 120, the user computing devices 110, and/or the other devices/systems in the computing environment 100 may, in some instances, be and/or comprise special-purpose computing devices configured to perform specific functions.

Figure 1B:
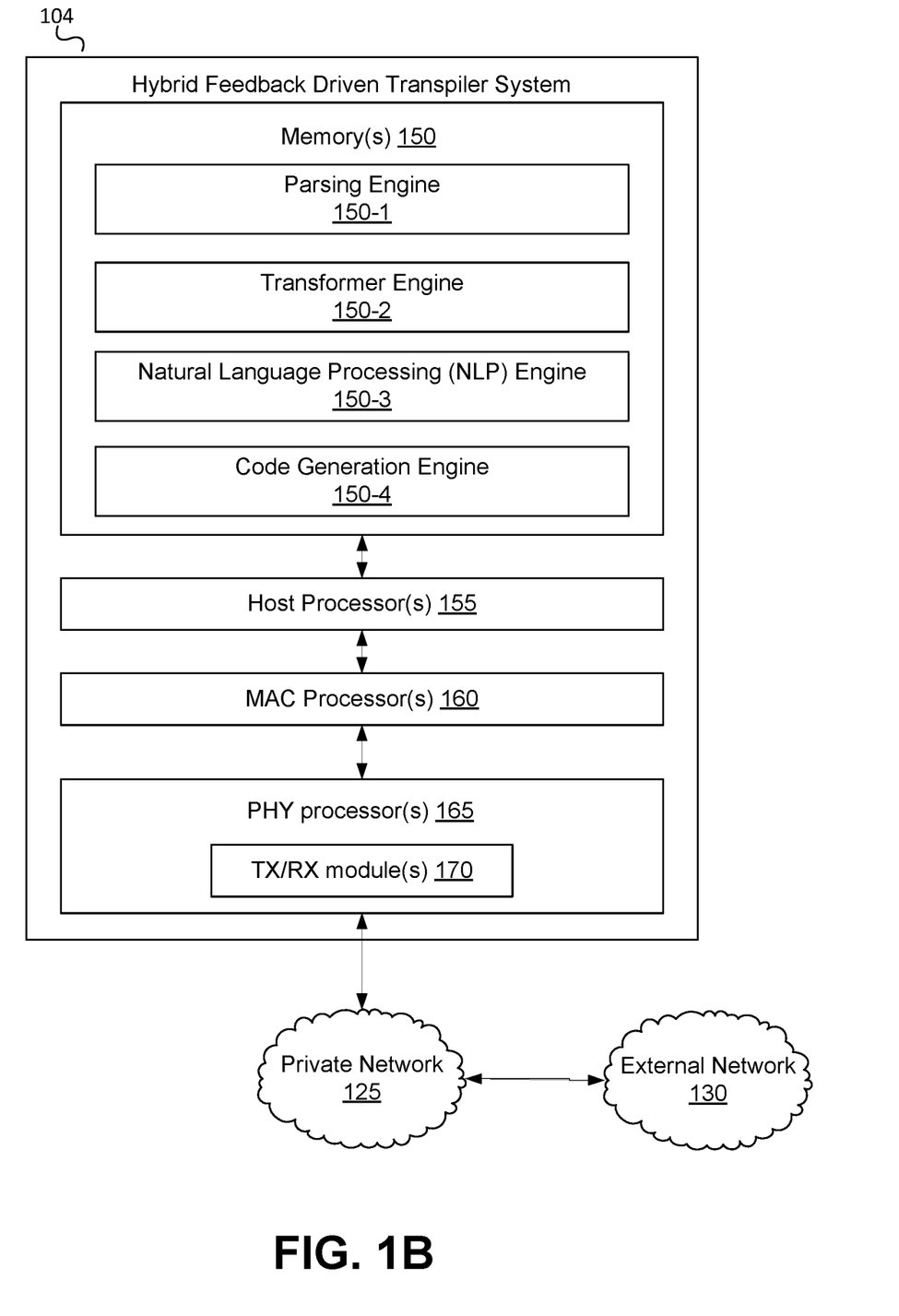
FIG. 1B shows an illustrative computing platform enabled for feedback driven transpilation of code, in accordance with one or more aspects described herein.

FIG. 1B shows an illustrative hybrid feedback driven transpilation system 104 in accordance with one or more examples described herein. The hybrid feedback driven transpilation system 104 may be a stand-alone device and/or may at least be partial integrated with another computing system and may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The hybrid feedback driven transpilation system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the hybrid feedback driven transpilation system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the hybrid feedback driven transpilation system 104 may be configured to execute machine readable instructions stored in memory 150. The memory 150 may comprise (i) one or more program modules/engines having instructions that when executed by the one or more processors cause the hybrid feedback driven transpilation system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the hybrid feedback driven transpilation system 104 and/or by different computing devices that may form and/or otherwise make up the hybrid feedback driven transpilation system 104.

For example, the memory 150 may have, store, and/or comprise a parsing engine 150-1, a transformer engine 150-2, an NLP engine 150-3, a code generation engine 150-4 and/or the like. The parsing engine 150-1 may have instructions that direct and/or cause the hybrid feedback driven transpilation system 104 to perform one or more operations associated with loading an input code source (e.g., a source file, a code base, and the like), analyzing the code to identify key aspects (e.g., key words, terms, parameters, and the like), identify a source language of the code, and formatting the parsed language into a common format associated with that language (e.g., a parse tree, an abstract syntax tree (AST), and the like) that may be used as an input to the transformer engine 150-2. The transformer engine 150-2 may have instructions that direct and/or cause the hybrid feedback driven transpilation system 104 to perform one or more operations associated with transforming an input file (e.g., an AST in a source language) into an output file (e.g., an AST in a destination language) based on natural language processing analysis of the input file. The NLP engine 150-3 may have instructions that direct and/or cause the hybrid feedback driven transpilation system 104 to perform one or more operations associated with identification of words and phrases associated with one or more languages and automatically improving this the language-based identification via a feedback engine. The code generation engine 150-4 may have instructions that direct and/or cause the hybrid feedback driven transpilation system 104 to perform one or more operations associated with transforming an input file (e.g., an AST in a destination language) into an output file (e.g., a code file in one or more code languages or dialects) based on an AST file output by the transformer engine 150-2.

While FIG. 1A illustrates the hybrid feedback driven transpilation system 104, the application computing systems 108, the source computing system 122, and the destination computing system 123 as being separate elements connected in the private network 125, in one or more other arrangements, functions of one or more of the above may be integrated in a single device/network of devices. For example, elements in hybrid feedback driven transpilation system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the application computing systems 108, the source computing system 122, and/or the destination computing system 123.

Figure 2:
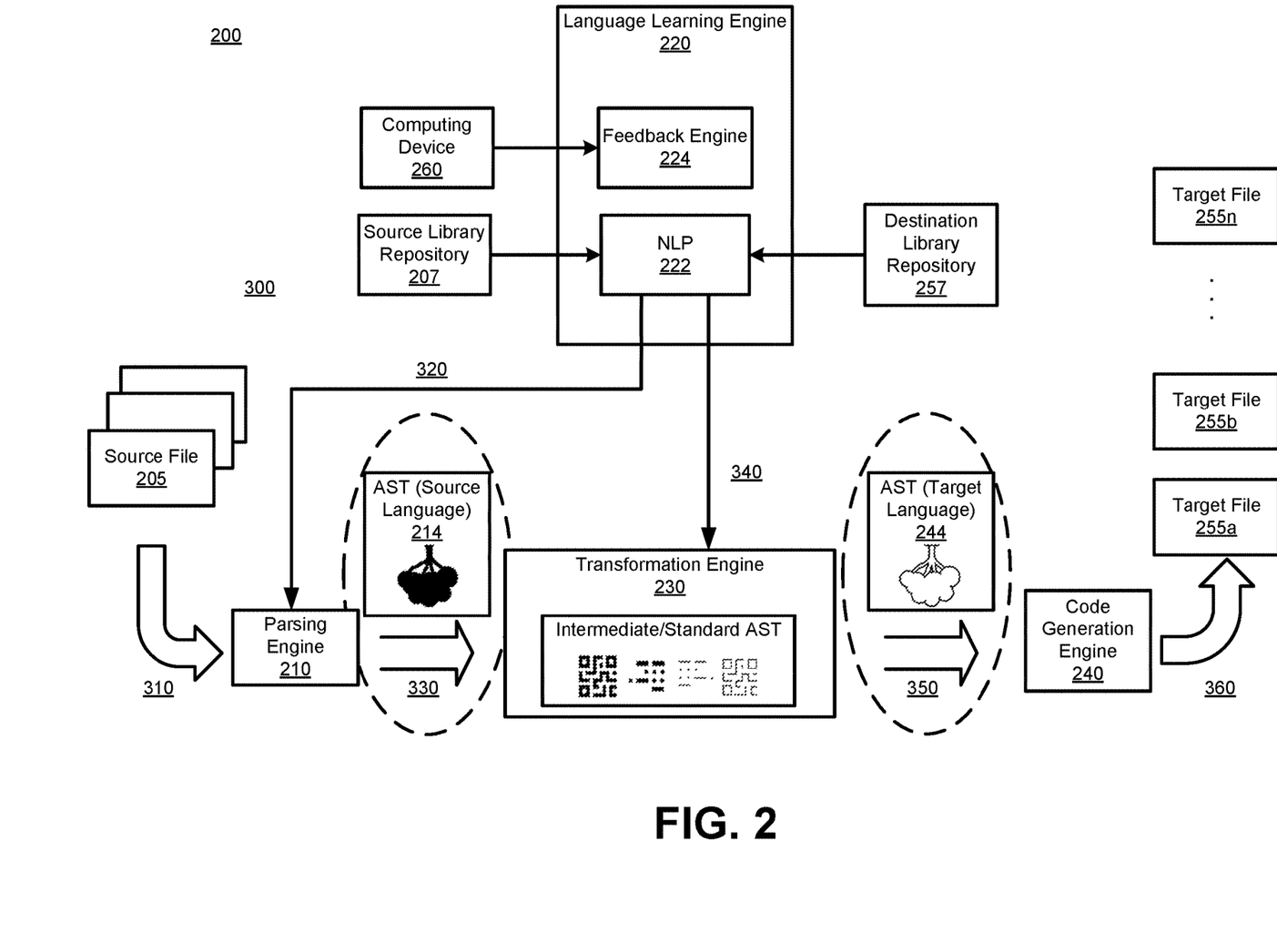
FIG. 2 shows an illustrative system and method for feedback driven transpilation of code in accordance with one or more aspects described herein.

FIG. 2 shows an illustrative system 200 and method 300 for feedback driven transpilation of code in accordance with one or more aspects described herein. The system 200 may include a data store storing source code (e.g., one or more source files 205), a parsing engine 210, a language learning engine 220, a transformation engine 230, a code generation engine 240, and a data store storing translated code for use on a target computing system (e.g., the target files 250a-n). The language learning engine 220 may further include a natural language processor 222 and a feedback engine e224, where the NLP 222 may be capable of identifying terms, phrases and/or other language items based on analysis of information stored in a source library repository 207 and a destination library repository 257. In some cases, the feedback engine 224 may receive feedback from a computing device 260 that may be used to automatically enhance a language identification model processed by the NLP 222.

Aspects of the system 200 and method 300 concerns translation of programming languages and more particularly, automatic translation of programming languages during a platform migration. When an application or other technically programmed solution is built using a particular programming language, time and effort is expended to build the application. Such applications and/or technically programmed solutions have a finite lifetime, due to hardware aging and/or advancements, improved technological platforms, lost support for a vendor supplied product, and/or the like. As such, a point is reached in the application life cycle when the application is migrated to another technology stack and/or platform, which means migrating all backend technology, including any customized programming aspects, and the full dataset. Aspects of this disclosure may concern migrating backend technology such as a database or other data repository, but can be applied to other technology utilizing programmed features including web servers, application servers, hosts, kiosks, and the like.

In an illustrative example, data may be migrated from one database technology platform to another, such as from a structured query language (SQL) based platform (e.g., a relational database platform) to a non-relational database platform (e.g., a noSQL database platform), a big data database platform, and the like. Within the technology stack for an SQL-based database platform, queries and other functionality may be customized and/or programmed based on an SQL dialect that has been customized for a specific technology platform (e.g., a vendor specific SQL dialect). Dialects of a particular programming language may have common elements that conform to a programming language standard and also may include customized features that the vendor uses to enhance their product. For the most part, the programming language or dialect may be used to develop reports, dashboards, and other data intensive functionalities. During migration, the data itself may be easily migrated to the new platform, the code and other customized functionalities may be left behind on the old platform. As such, movement of the programmed functionalities from the original technology stack to the new technology stack requires a massive manual task to convert the programmed features from the original programming language or dialect of the original technology platform to the new programming language or dialect utilized by the target technology platform. For example, an SQL based database used by an enterprise organization may include millions (e.g., 1 million, 2 million, 5 million, and the like) user queries, which would require a large amount of effort and a long time to convert. As such, a need has been recognized for a system to facilitate automatic migration and transpilation of programming languages, such as by utilizing a machine learning engine, to convert programmed functionalities (e.g., queries, functions, and the like) from a source programming language (or dialect of a language) to a target programming language.

In some cases, the system 200 may be used to perform a method 300 of code migration from a first computing platform (e.g., a source computing platform) to a second computing platform (e.g., a destination computing platform, a target computing platform, or the like). For example, a data repository may be migrated from a source computing platform to a destination computing platform based on a change in database vendors for the enterprise organization, an update to an existing data repository product, an update to a new product version or new product that supports a different programming language, and/or the like. While data migration may be automated during this process, migration of an existing code base (e.g., schemas, queries, macros, and the like) may not be capable of being automatically moved to the new platform. As such, much time and effort used to develop the existing code base may be lost. Additionally, hardware costs may be increased due to the additional time needed to maintain the hardware infrastructure for both the source computing platform and the new destination computing platform. Further, communications and/or other activities may be delayed due to lost links or links to a wrong platform may be included in the new computing platform and/or the applications using or otherwise accessing the data. As such a need has been recognized to streamline the transformation of code between the source computing system and/or a target computing systems, such as by automatically transforming the code from a source language and/or one or more dialects of the source language to a target language or one or more dialects of the target language via a hybrid feedback-driven transformation system 200.

In some cases, the system 200 and method 300 facilitates a robotic framework to automate translation (e.g., transpilation) of functionalities programmed in a source language or dialect to corresponding functionalities in a target language or dialect. The system 200 may include machine learning enabled engines (e.g., the language learning engine 220, the NLP 222, the transformation engine 230, and the like) to provide a self-supported and self-learning environment to automate transpilation functionality with minimal to no human interaction. The system 200 is self-healing and provides self-correcting functionality over time. For example, any errors due to mis-transpilation of functionalities to the target system may be feed back into the language learning engine 220 to improve a machine learning-based transpilation model for transpilation from the source language to the target language.

In some cases, the system 200 and method 300 facilitates a robotic framework to automate translation (e.g., transpilation) of functionalities programmed in a source language or dialect to corresponding functionalities in a target language or dialect. The system 200 may include machine learning enabled engines (e.g., the language learning engine 220, the NLP 222, the transformation engine 230, and the like) to provide a self-supported and self-learning environment to automate transpilation functionality with minimal to no human interaction. The system 200 is self-healing and provides self-correcting functionality over time. For example, any errors due to mis-transpilation of functionalities to the target system may be feed back into the language learning engine 220 to improve a machine learning-based transpilation model for transpilation from the source language to the target language.

The method 300 may generally start with a base of learned source dialect information, apply transpilation transformations to a target language based on a trained intelligent machine learning model, and generate target code in the target language based on the transformed information. The system 200 and method 300 may include multiple aspects, such as bidirectional hopping to support multi-language transpilation capabilities, automatic conversion of language mappings into a conversion specification, a hybrid feedback mechanism to supplement automatic feedback learning with human feedback on an as-needed bases and incorporating that feedback into the conversion specifications, allowing the system 200 and method 300 the ability to organically scale and evolve with improvements to technologies, and self-learning updates to grammar and vocabularies of each programmed language or dialect.

At 310, the parsing engine 210 may parse or otherwise analyze one or more source files 205 containing source code to be translated. The parsing engine 210 may identify a language or a dialect of the language and may generate an input file for the transformation engine 230. For example, the parsing engine 210 may generate an AST file 214 corresponding to the source language of the source file 205. Additionally, at 320, the parsing engine 210 may further optimize the AST file 214 via feedback received from the NLP 222 to automatically enhance term identification by the parsing engine 210. At 330, the transformation engine 230 may process the source AST file 214 based on information received from the NLP 222 of the language learning engine 220. For example, the language learning engine 220 may provide, based on an indication of the source language or dialect and an indication of the destination language or dialect, identification of words and/or phrases indicative of a particular language or dialect used for programming a particular application and/or for queries within a particular data repository environment.

In some cases, the system 200 and method 300 may facilitate bidirectional hopping to support multi-language transpilation, where a transpiler automatically solves a problem of moving a developed code base between platforms, where the vocabulary and grammar of a programming language are mapped to others. The transpilation system may provide an automated process to move programmed functionalities between technology platforms having disparate programming languages or different dialects of programming languages. The transpilation system 200 may provide a method 300 that automatically expands transpilation functionalities based on learned relationships between programming languages or dialects. In an illustrative example, a transpilation mapping from programming language A to programming language B and a transpilation mapping from programming language A to programming language C may be learned by the transpilation system. Based on these learned relationships between programming language A and B and between programming language A and C, the transpilation system may automatically learn a transpilation between programming languages B and C. As such, learned relationships between additional languages may be automatically expanded to other languages. For example, a transpilation between programming languages C and D may be learned by the transpilation system. As such, the transpilation system may also automatically expand the transpilation capability to transpile code from programming language A to D and from B to D. As such, once the transpiler system 200 creates an initial mapping between any two languages, the system can learn relationships between other combinations of learned languages or dialects.

Additionally, the transpilation system 200 may be capable of automatic conversions of mappings into a translation or transpilation specification. For example, the language learning engine 220 may be capable of capturing or automatically learning nuances of programming languages or dialects. Programming languages often provide general functionality that can be leveraged in multiple ways to achieve desired functionalities. For example, different programmers can write programs or functions that generate a same output by performing different intermediate operations. As such, a person's skill, experience and/or creativity often determines how that particular person creates their code. The language learning engine 220 therefore learns multiple ways to emulate particular functionalities, such as by using a constraint-driven automatic process to convert mappings into a configuration specification. In some cases, the language learning engine 220 may provide a user interface where a user may configure a transpilation mapping to use a particular sequence of operations within the source language and/or the target language. In some cases, the user interface screen may include an input section where the user may enter the transpilation information, such as by entering code as text, graphically, pseudo code and the like. The user interface screen may also include a button to trigger the language learning engine to generate the translated code. In some cases, the language learning engine 220 may automatically convert the code based on the learned model. In some cases, the language learning engine 220 may receive feedback from learned transpilations performed between other languages and based on use of combination of terms and/or operators. In some cases, the language learning engine 220 may provide a user interface screen that displays the transpiled code for review and/or approval by the user. The user may be given one or more interface tools to edit the transpiled code. For example, a configuration file may be created and entered. Once entered, the language learning engine 220 updates the transpilation models such that on a future transpilation event, the language learning engine 220 may identify patterns of terms and/or operators and provide a conversion for the next instance of the pattern. In doing so, the language learning engine 220 allows the system to learn on the fly, e.g., update vocabulary and/or grammar of a programming language or dialect, during operation, where these learned patterns allow the system to improve the automatic conversions. In doing so, the learning capabilities are improved without going through another development cycle. Additionally, future manual conversions are eliminated through this automatic generation of configuration specification (e.g., pattern configuration specifications, functional configuration specifications, and the like). In some cases, the configuration specification may be specific to certain users or user groups. In some cases, the configuration specification may be made available for general use and used to update one or more transpilation models. Once the configuration specifications are learned, a global vocabulary is updated and expended for use going forward.

In some cases, the system 200 may include a hybrid feedback mechanism within the language learning engine 220, where the generation of configuration specifications may be automated using the NLP 222 and a machine learning engine. For example, the source library repository 207 and/or the target library repository 257 may store files associated with corresponding programming languages and/or dialects, such as programming references, sample code functionality, and/or other support documentation. In some cases, the source library repository 207 and/or the target library repository 257 may include flowcharting or other code visualization tool information, along with pseudo code information as preferred by the enterprise organization and/or programmers associated with the enterprise organization. The NLP 222 may analyze the files stored in the source library repository 207 and/or the target library repository 257 to generate a base "thesaurus and/or dictionary", e.g., vocabulary and/or grammar, of one or more programming languages or dialects. For example, each vendor of a programming product (e.g., a database platform, compiler, and the like) may provide documentation about available functionality within the platform and how the functionality may be used and/or customized. Such information may include function listings, function descriptions, sample programs, sample functions, and/or other programming examples or best practices. Such information may be analyzed by the NLP 222 to allow the language learning engine 220 to build one or more configuration specifications for that particular language or dialect and/or for related languages or dialects. Additionally, the configuration specification may be used to update and allow the machine learning model to automatically learn functionalities and to make connections with similar functionalities between programming languages. The NLP 222 may consumer this data and identify key features of a programming language such that the language learning engine may automatically identify a source or target language without user input or with minimal user input. If the language learning engine 220 identifies unknown functionality when transpiling code, the language learning engine may include a data crawler that may search an internal and/or external network for information concerning the unknown functionality. If found, the data crawler provides the information to the NLP for conversion and generation of a configuration specification.

In an illustrative example, the NLP may identify an unknown word or phrase, and may automatically check for additional information on an internal or external network. If nothing found, a user request may be triggered, such that a message may be automatically communicated to a user of a requesting user group to provide additional information and/or to confirm a proposed translation or transpilation of the unknown word or phrase. Once identified, a configuration specification may be generated and used to update a machine learning model. Additional feedback may also be given based on use or analysis of the transpiled output in the target language, where the feedback may be given as an error message identifying an unknown term or term, or performance of unexpected activities, and this feedback may be used to update the model and/or to trigger additional user input requests. Such processes may be used to generate a transpilation model capable of transpiling user defined functionalities. In some cases, certain combination of words or phrases may be identified and used to generate a configuration specification, where the words and/or phrase may have no meaning outside a specific learned context. In some cases, a human in the loop situation may occur in feedback situations in minimal cases (e.g., 2-3%), where no mapping can be identified on the source and/or target systems, such that new functionality may be entered manually and then used to update the ML model going forward.

As such, the bidirectional capabilities, where specifications and feedback may be used by a machine learning engine to learn and adapt automatically, allows the system 200 to organically scale without additional services being added. With this process, the configuration specifications, and feedback, the ML model for grammar and vocabulary transpilation can continue to automatically expand. Because the grammar and vocabulary continues to automatically update, the system is self-correcting where transpilation errors can trigger an update to the ML model to learn new mappings, such that a particular failure will not occur again. In some cases, data lineage capabilities can be leveraged to learn grammar and vocabulary aspects of a particular programming language and/or dialect.

At 340, the language learning engine 220 may apply the source AST 214 to the ML model to identify a source language, identify terms and operators within the AST (e.g., key terms in the vocabulary and grammar) of the identified language and output mappings in the specified target language for each identified term. If a term is unknown, the language learning engine 220 may initiate an error condition, provide substitute functionality from another similar language or dialect, and/or solicit feedback via the feedback engine 224 from a user via the computing device 260. The transformation engine 230 may use the information from the language learning engine 220 to generate an target AST 244 at 350 which may then be processed by the code generation engine to generate one or more output files (e.g., target files 255*a-n*) where each target file may be associated with a particular target language or dialect of the target language at 360.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:
a source computing system comprising a data repository storing a source file associated with a source programming language;
a target computing system comprising configured to process operations in a target file associated with a target programming language, wherein the source programming language and the target programming language are different programming languages;
a transpilation platform, comprising:
at least one processor; and
memory storing computer-readable instructions that, when executed by the at least one processor, cause the transpilation platform to:
receive, from the source computing system via a network, the source file;
parse the source file to generate a first intermediate file corresponding to a structure of the source programming language;
transpile, by a machine-learning (ML) transpilation model, terms from the source programming language to corresponding terms in the target programming language;
generate, based on transpiled terms received from the ML transpilation model, a second intermediate file corresponding to a structure of the target programming language;
generate, based on the second intermediate file, a target file comprising instructions in the target programming language, wherein the target file causes the target computing system to perform actions performed by the source computing system based on the source file; and
train, by a language learning engine, the ML transpilation model, based on feedback received from the target computing system after performance of operations based on execution of the target file.

2. The system of claim 1, wherein the target programming language is a dialect of the source programming language.

3. The system of claim 1, wherein the source programming language is unrelated to the target programming language.

4. The system of claim 1, wherein the first intermediate file is an abstract syntax tree (AST) file.

5. The system of claim 1, wherein the instructions cause the transpilation platform to automatically train the ML transpilation model based on documentation describing operations of the source programming language and the target programming language.

6. The system of claim 5, wherein the instructions cause the transpilation platform to:
process, via a natural language processor, the documentation describing operations of the source programming language:
generate a first configuration file based on output from the natural language processor, wherein the first configuration file identifies a plurality of characteristics of operations of the source programming language; and
train the ML model based on the first configuration file.

7. The system of claim 6, wherein the instructions cause the transpilation platform to:
process, via a natural language processor, the documentation describing operations of the target programming language:
generate a second configuration file based on output from the natural language processor, wherein the second configuration file identifies a plurality of characteristics of operations of the source programming language; and
train the ML model based on the second configuration file.

8. The system of claim 7, wherein the instructions cause the transpilation platform to:
generate, based on the first configuration file and the second configuration file, a first mapping between operations of the source programming language and the target programming language.

9. The system of claim 7, wherein the instructions cause the transpilation platform to:
process, via a natural language processor, the documentation describing operations of a third programming language:
generate a third configuration file based on output from the natural language processor, wherein the third configuration file identifies a plurality of characteristics of operations of the source programming language;
train the ML model based on the third configuration file; and
generate, by the ML model, a second mapping of operations between the target programming language and the third programming language.

10. The system of claim 9, wherein the instructions cause the transpilation platform to:
generate, by the ML model and based on first mapping of operations and the second mapping of operations, a third mapping of operations between the source programming language and the third programming language.

11. A method comprising:
receiving, from a source computing system via a network, a source file, wherein the source computing system comprises a data repository storing a source file associated with a source programming language, wherein the source file, when processed by the source computing system, causes a source computing system to perform a first operations;
parsing the source file to generate a first intermediate file corresponding to a structure of the source programming language;
transpiling, by a machine-learning (ML) transpilation model, terms from the source programming language to corresponding terms in a target programming language, wherein the target programming language is used by a target computing system to provide programmed functionalities;
generating, based on transpiled terms received from the ML transpilation model, a second intermediate file corresponding to a structure of the target programming language;
generating, based on the second intermediate file, a target file comprising instructions in the target programming language, wherein the target file causes the target computing system to perform actions similar to those performed by the source computing system based on the source file; and training, by a language learning engine, the ML transpilation model, based on feedback received from the target computing based on execution of the target file by the target computing system.

12. The method of claim 11, wherein the target programming language is a dialect of the source programming language.

13. The method of claim 11, wherein the source programming language is unrelated to the target programming language.

14. The method of claim 11, wherein the first intermediate file is an abstract syntax tree (AST) file.

15. The method of claim 11, further comprising automatically training the ML transpilation model based on documentation describing operations of the source programming language and the target programming language.

16. The method of claim 15, further comprising:

processing, via a natural language processor, the documentation describing operations of the source programming language:

generating a first configuration file based on output from the natural language processor, wherein the first configuration file identifies a plurality of characteristics of operations of the source programming language; and training the ML model based on the first configuration file.

17. The method of claim 16, further comprising:

processing, via a natural language processor, the documentation describing operations of the target programming language:

generating a second configuration file based on output from the natural language processor, wherein the second configuration file identifies a plurality of characteristics of operations of the source programming language; and training the ML model based on the second configuration file.

18. The method of claim 17, further comprising generating, based on the first configuration file and the second configuration file, a first mapping between operations of the source programming language and the target programming language.

19. The method of claim 18, further comprising:

processing, via a natural language processor, the documentation describing operations of a third programming language:

generating a third configuration file based on output from the natural language processor, wherein the third configuration file identifies a plurality of characteristics of operations of the source programming language;

training the ML model based on the third configuration file; and generating, by the ML model, a second mapping of operations between the target programming language and the third programming language.

20. The method of claim 19, further comprising generating, by the ML model and based on first mapping of operations and the second mapping of operations, a third mapping of operations between the source programming language and the third programming language.

* * * * *